(12) United States Patent
Brandt et al.

(10) Patent No.: US 11,354,128 B2
(45) Date of Patent: Jun. 7, 2022

(54) OPTIMIZED MODE TRANSITIONS THROUGH PREDICTING TARGET STATE

(71) Applicant: Intel Corporation, Santa Clara, CA (US)

(72) Inventors: Jason W. Brandt, Austin, TX (US); Vedvyas Shanbhogue, Austin, TX (US); Kameswar Subramaniam, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 340 days.

(21) Appl. No.: 14/639,004

(22) Filed: Mar. 4, 2015

(65) Prior Publication Data

US 2016/0259644 A1 Sep. 8, 2016

(51) Int. Cl.
*G06F 9/30* (2018.01)

(52) U.S. Cl.
CPC ...... *G06F 9/30189* (2013.01); *G06F 9/30145* (2013.01)

(58) Field of Classification Search
CPC .................................................. G06F 9/30189
See application file for complete search history.

(56) References Cited

U.S. PATENT DOCUMENTS

| | | | | |
|---|---|---|---|---|
| 5,854,913 A * | 12/1998 | Goetz | ................. | G06F 9/30174 711/207 |
| 6,240,506 B1 * | 5/2001 | Miller | ................. | G06F 9/30152 712/205 |
| 7,149,878 B1 * | 12/2006 | Jensen | ................. | G06F 9/30076 712/209 |
| 7,171,543 B1 * | 1/2007 | Ronen | ................. | G06F 9/3017 711/212 |
| 7,562,179 B2 | 7/2009 | Brandt et al. | | |
| 7,840,783 B1 * | 11/2010 | Singh | ................. | G06F 9/30112 712/217 |
| 2004/0172631 A1 * | 9/2004 | Howard | ............. | G06F 9/30087 718/100 |
| 2005/0283593 A1 * | 12/2005 | Vasekin | ................. | G06F 9/3848 712/240 |
| 2011/0320793 A1 * | 12/2011 | Bell, Jr. | ................. | G06F 9/5011 712/240 |

(Continued)

OTHER PUBLICATIONS

Z/Architecture Principles of Operation, IBM® Publication No. SA22-7832-09, Tenth Edition, Sep. 2012.*

(Continued)

*Primary Examiner* — Keith E Vicary
(74) *Attorney, Agent, or Firm* — Nicholson De Vos Webster & Elliott, LLP

(57) ABSTRACT

In one embodiment, software executing on a data processing system that is capable of performing dynamic operational mode transitions can realize performance improvements by predicting transitions between modes and/or predicting aspects of a new operational mode. Such prediction can allow the processor to begin an early transition into the target mode. The mode transition prediction principles can be applied for various processor mode transitions including 64-bit to 32-bit mode transitions, interrupts, exceptions, traps, virtualization mode transfers, system management mode transfers, and/or secure execution mode transfers.

23 Claims, 16 Drawing Sheets

(56) References Cited

U.S. PATENT DOCUMENTS

2014/0108742 A1* 4/2014 Boettiger ............ G06F 12/0862
  711/137
2014/0380027 A1 12/2014 Yasin et al.
2015/0007196 A1 1/2015 Toll et al.

OTHER PUBLICATIONS

"Chapter 3 Basic Execution Environment", Basic Execution Environment, vol. 1, pp. 1-24.

* cited by examiner

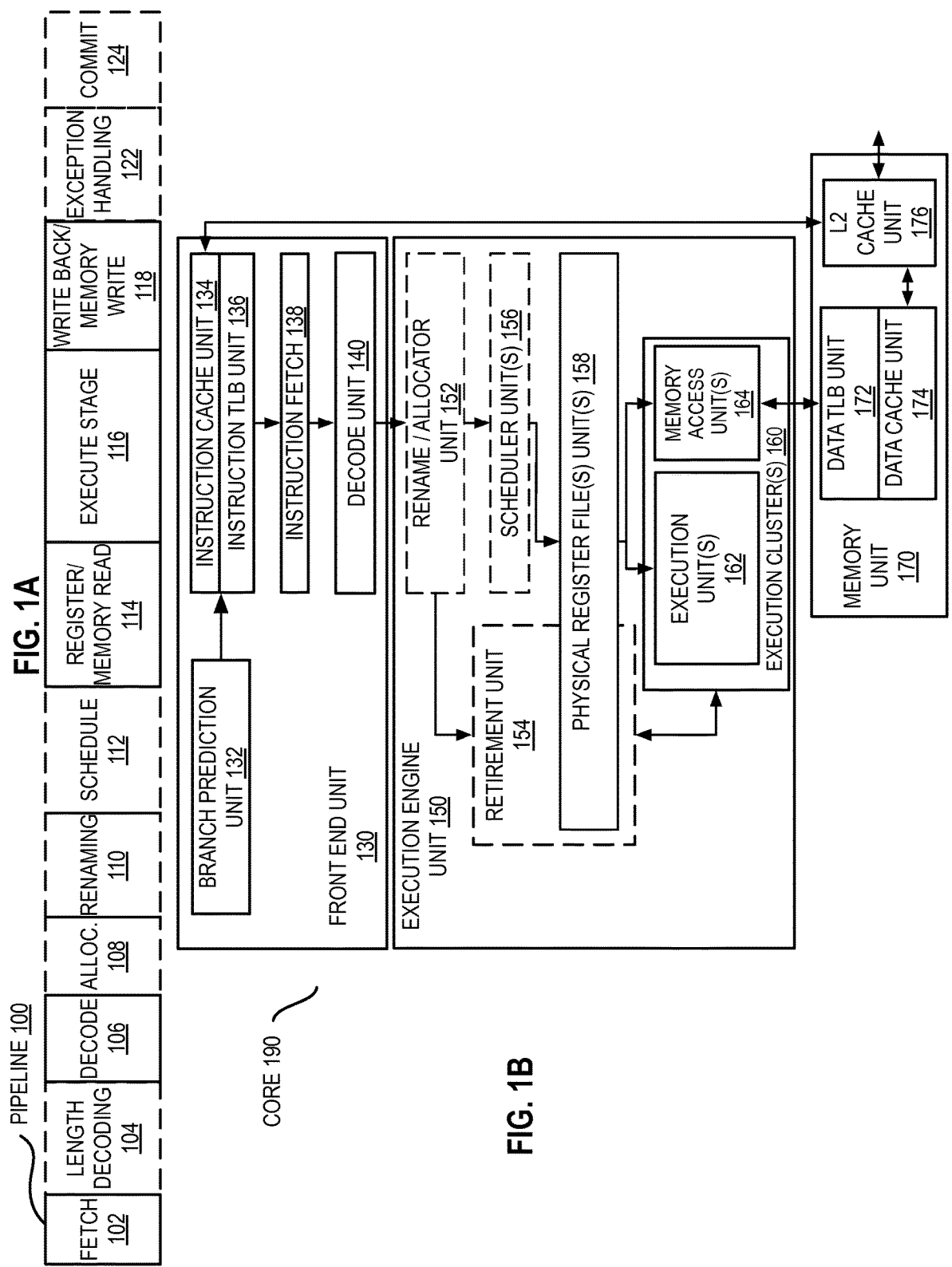

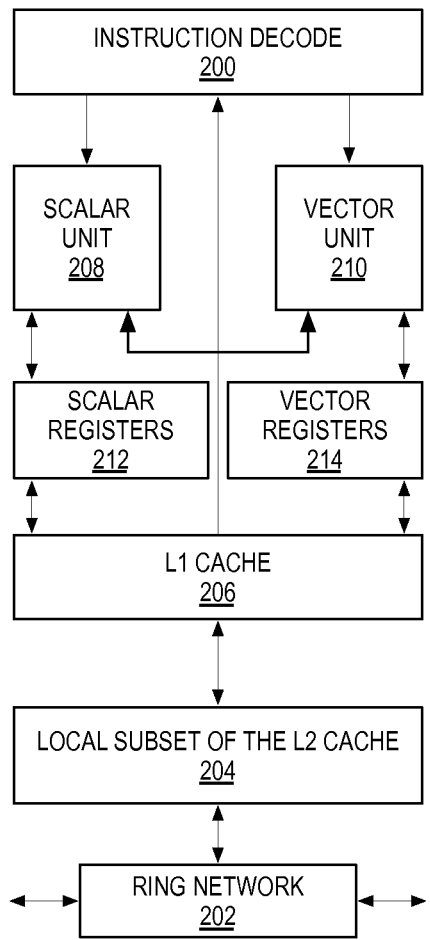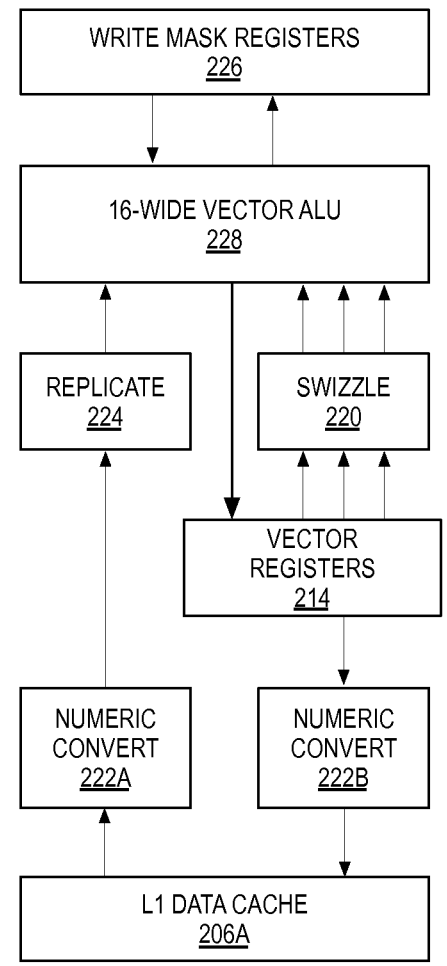

Segment Selector Usage - 1200
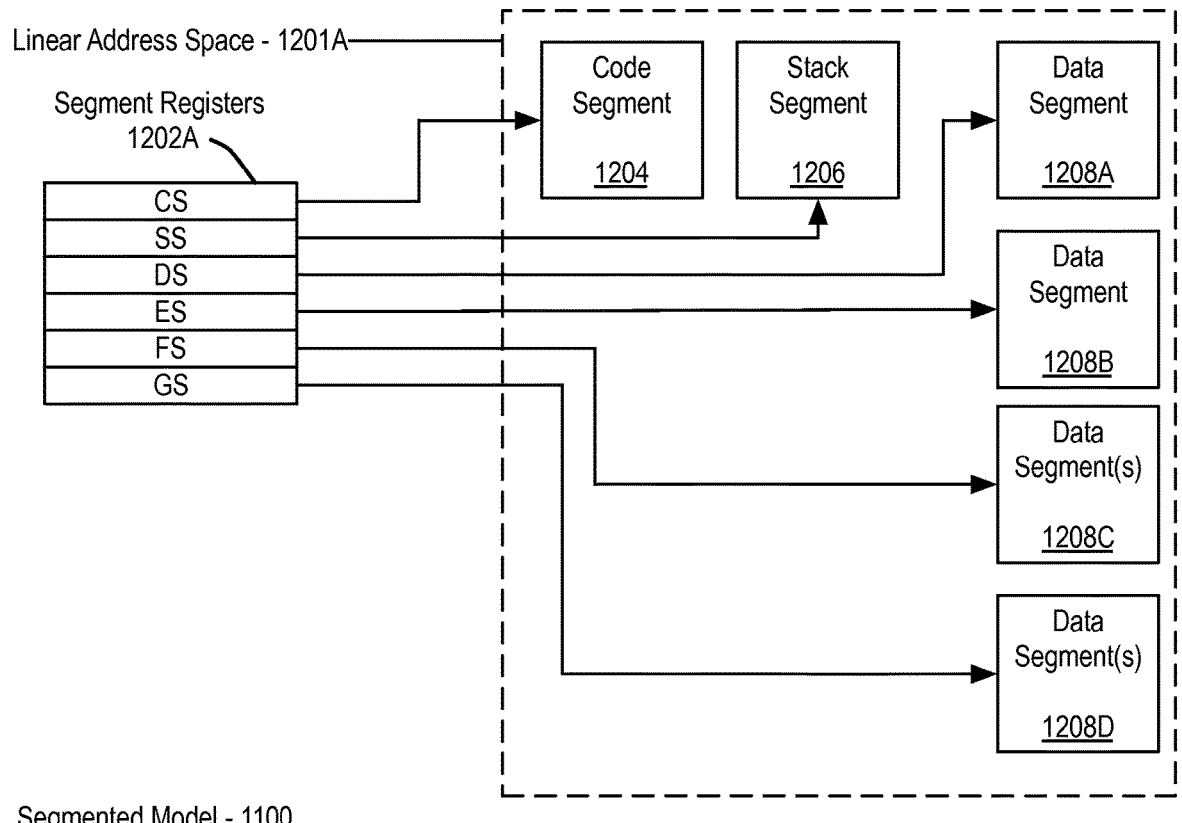
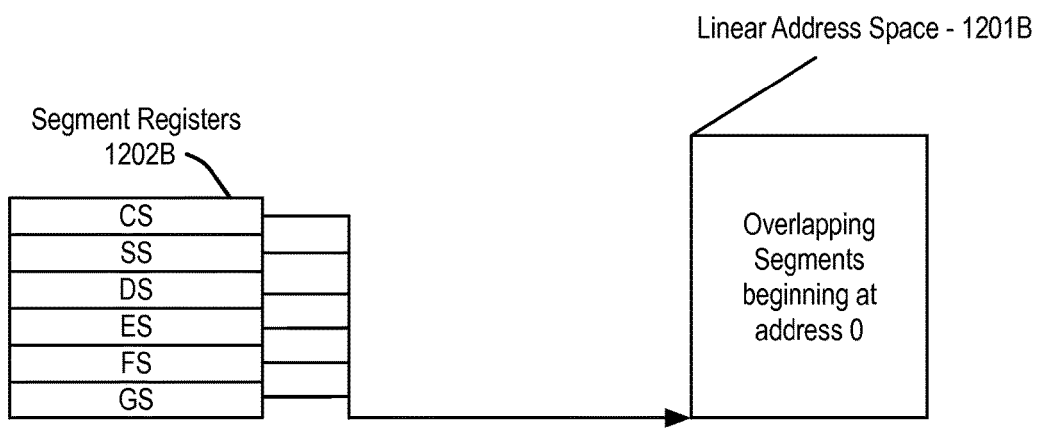
FIG. 12

OPTIMIZED MODE TRANSITIONS THROUGH PREDICTING TARGET STATE

FIELD OF THE INVENTION

The present disclosure pertains generally to the field of processing logic and microprocessors. More specifically to the field of operational mode transitions within a processor architecture.

BACKGROUND OF THE DESCRIPTION

Some processor architectures provide functionality to allow processors to transitioning between various operational modes. For example, processors may be configured to allow a dynamic transition between a 64-bit operational mode and a 32-bit operational mode. However, when performing a mode transition, a processor may be required to serialize instruction execution such that older operations that use a current operational mode are completed before transitioning modes and executing new operations using the new operational mode. Accordingly, processor operational mode transitions may result in a performance penalty, particularly if mode transitions are frequent.

DESCRIPTION OF THE FIGURES

Embodiments are illustrated by way of example and not limitation in the Figures of the accompanying drawings, in which:

FIG. 1A is a block diagram illustrating both an exemplary in-order fetch, decode, retire pipeline and an exemplary register renaming, out-of-order issue/execution pipeline according to embodiments;

FIG. 1B is a block diagram illustrating both an exemplary embodiment of an in-order fetch, decode, retire core and an exemplary register renaming, out-of-order issue/execution architecture core to be included in a processor according to embodiments;

FIG. 2A-B are block diagrams of a more specific exemplary in-order core architecture

FIG. 12 is a block diagram of segment register usage for the exemplary memory models;

DETAILED DESCRIPTION

Figure 3:
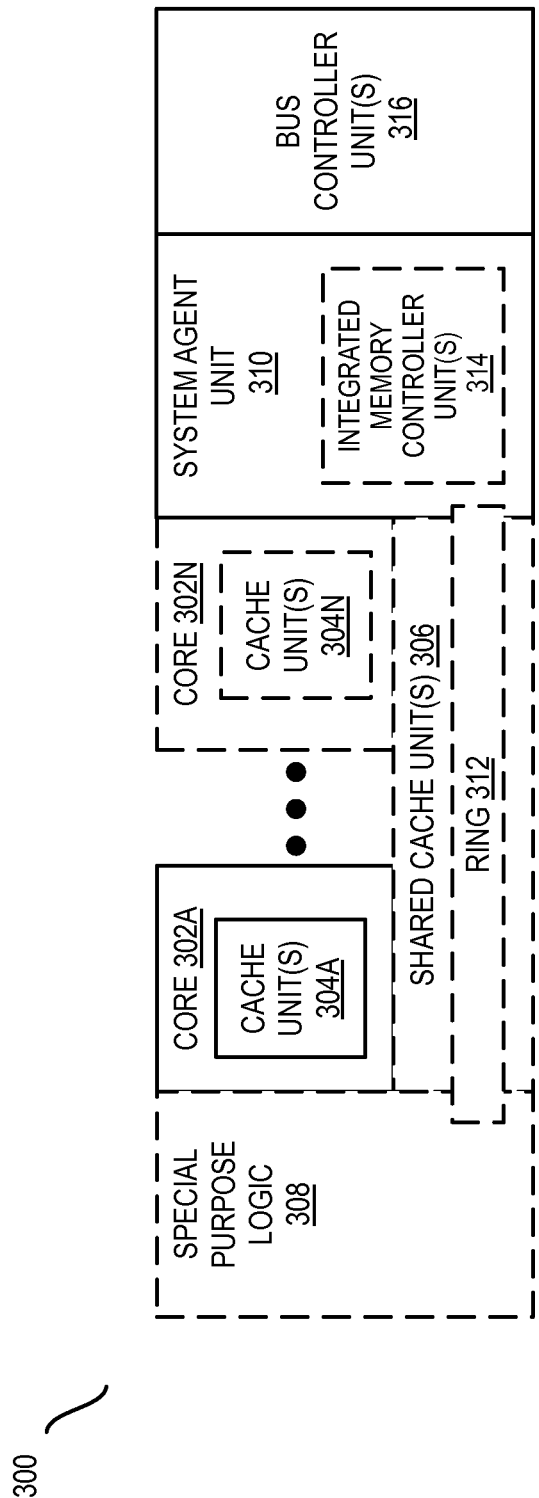
FIG. 3 is a block diagram of a single core processor and a multicore processor with integrated memory controller and special purpose logic.

Some processors known in the art are able to predict branch targets (e.g., branch predicting, out of order executing processors). However, processors known in the art are not able to predict the operational mode that will be entered by more complex control flow transfers, which can change the operational mode of the processor. Operational mode details can include the new address size, default address and operand sizes, code segment parameters, stack segment parameters, and other details used by the processor to configure an execution environment. Loading the operating mode details and configuring the processor for execution in that mode can increase the latency of instructions or operations that can change mode, impacting performance.

In embodiments described herein, software executing on a data processing system that is capable of performing dynamic operational mode transitions can realize performance improvements by predicting transitions between modes and/or predicting aspects of a new operational mode. Such prediction can allow the processor to begin an early transition into the target mode. The mode transition prediction principles can be applied for various processor mode transitions including 64-bit to 32-bit mode transitions, interrupts, exceptions, traps, virtualization mode transfers, system management mode transfers, and/or secure execution mode transfers.

Described below are processor core architectures followed by descriptions of exemplary processors and computer architectures according to embodiments described herein. Numerous specific details are set forth in order to provide a thorough understanding of the embodiments of the invention described below. It will be apparent, however, to one skilled in the art that the embodiments may be practiced without some of these specific details. In other instances, well-known structures and devices are shown in block diagram form to avoid obscuring the underlying principles of the various embodiments.

Exemplary Core Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Processors may be implemented using a single processor core or can include a multiple processor cores. The processor cores within the processor may be homogenous or heterogeneous in terms of architecture instruction set.

Implementations of different processors include: 1) a central processor including one or more general purpose in-order cores for general-purpose computing and/or one or more general purpose out-of-order cores intended for general-purpose computing; and 2) a coprocessor including one or more special purpose cores intended primarily for graphics and/or scientific (e.g., many integrated core processors). Such different processors lead to different computer system architectures including: 1) the coprocessor on a separate chip from the central system processor; 2) the coprocessor on a separate die, but in the same package as the central system processor; 3) the coprocessor on the same die as other processor cores (in which case, such a coprocessor is sometimes referred to as special purpose logic, such as integrated graphics and/or scientific (throughput) logic, or as special purpose cores); and 4) a system on a chip that may include on the same die the described processor (sometimes referred to as the application core(s) or application processor (s)), the above described coprocessor, and additional functionality.

In-Order and Out-of-Order Core Block Diagram

FIG. 1A is a block diagram illustrating an exemplary in-order pipeline and an exemplary register renaming out-of-order issue/execution pipeline, according to an embodiment. FIG. 1B is a block diagram illustrating both an exemplary embodiment of an in-order architecture core and an exemplary register renaming, out-of-order issue/execution architecture core to be included in a processor according to an embodiment. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general-purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM® instruction set (with optional additional extensions such as NEON) of ARM Holdings of Cambridge, England), including the instruction(s) described herein. In one embodiment, the core 190 includes logic to support a packed data instruction set extension (e.g., AVX1, AVX2, etc.), allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading Technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 2A-B are block diagrams of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to an embodiment. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly and in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 2B is an expanded view of part of the processor core in FIG. 2A according to an embodiment. FIG. 2B includes an L1 data cache 206A part of the L1 cache 204, as well as more detail regarding the vector unit 210 and the vector registers 214. Specifically, the vector unit 210 is a 16-wide vector-processing unit (VPU) (see the 16-wide ALU 228), which executes one or more of integer, single-precision float, and double precision float instructions. The VPU supports swizzling the register inputs with swizzle unit 220, numeric conversion with numeric convert units 222A-B, and replication with replication unit 224 on the memory input. Write mask registers 226 allow predicating resulting vector writes.

Processor with Integrated Memory Controller and Special Purpose Logic

FIG. 3 is a block diagram of a processor 300 that may have more than one core, may have an integrated memory controller, and may have integrated graphics according to an embodiment. The solid lined boxes in FIG. 3 illustrate a processor 300 with a single core 302A, a system agent 310, a set of one or more bus controller units 316, while the optional addition of the dashed lined boxes illustrates an alternative processor 300 with multiple cores 302A-N, a set of one or more integrated memory controller unit(s) 314 in the system agent unit 310, and special purpose logic 308.

Thus, different implementations of the processor 300 may include: 1) a central application processor with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the integrated graphics logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multithreading. The system agent 310 includes those components coordinating and operating cores 302A-N. The system agent unit 310 may include for example a power control unit (PCU) and a display unit. The PCU may be or include logic and components needed for regulating the power state of the cores 302A-N and the integrated graphics logic 308. The display unit is for driving one or more externally connected displays.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

Exemplary Computer Architectures

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
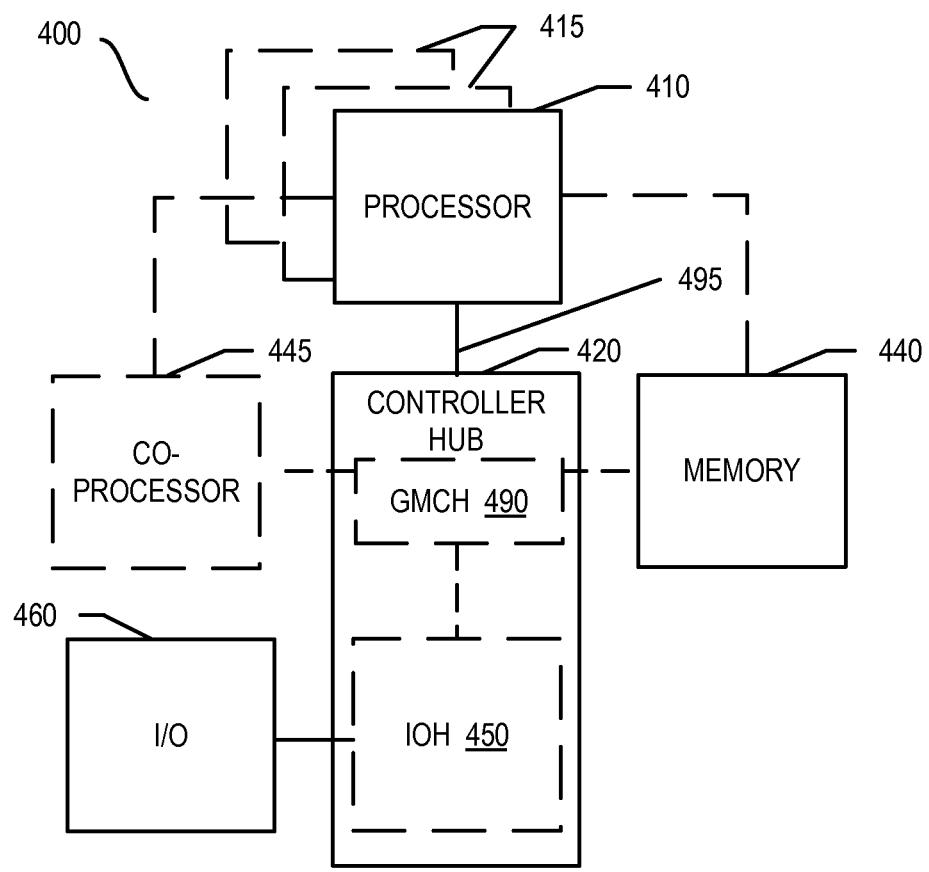
FIG. 4 illustrates a block diagram of a system in accordance with an embodiment.

FIG. 4 shows a block diagram of a system 400 in accordance with an embodiment. The system 400 may include one or more processors 410, 415, which are coupled to a controller hub 420. In one embodiment the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multi-drop bus, such as a frontside bus (FSB), point-to-point interface such as QuickPath Interconnect (QPI), or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
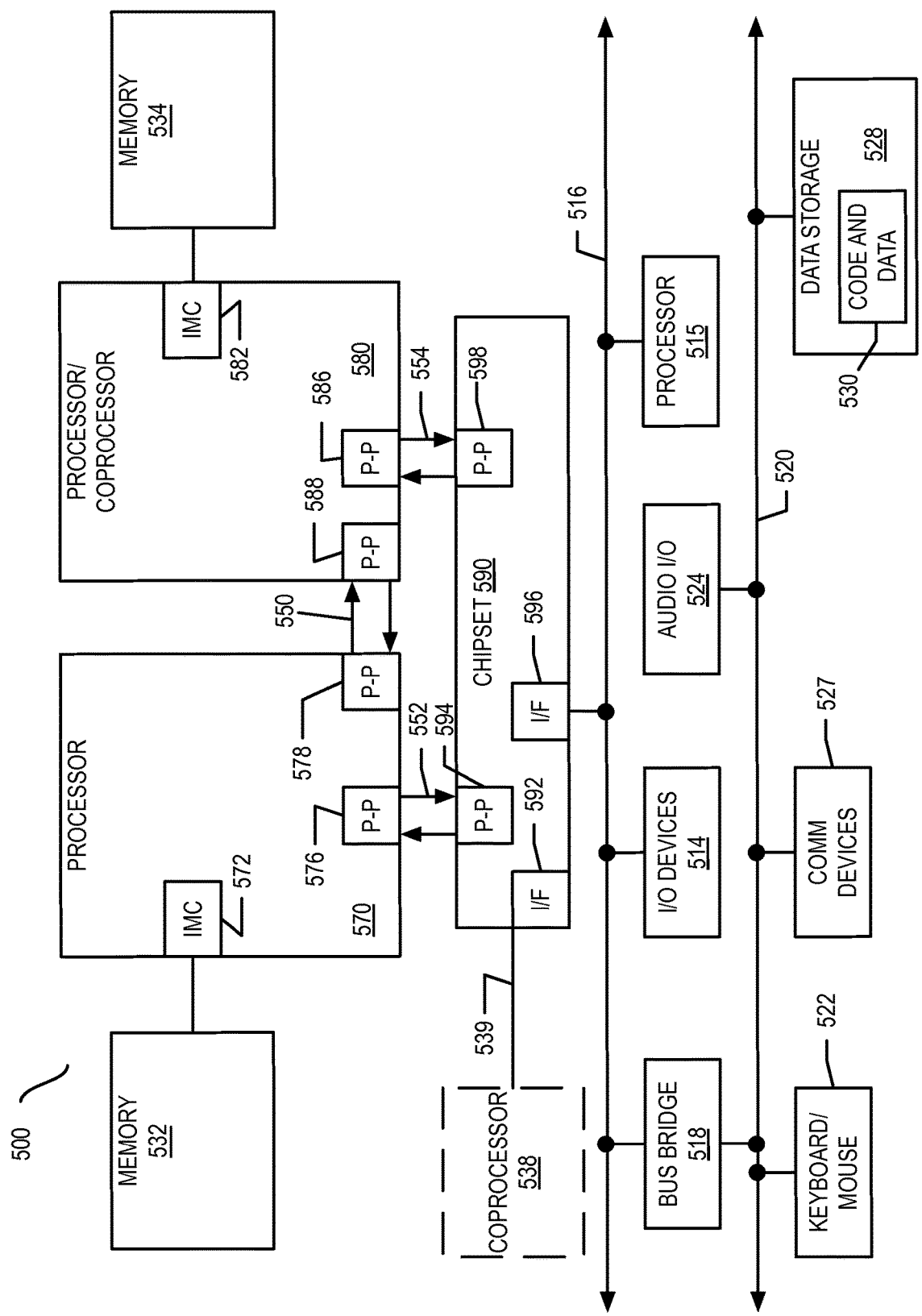
FIG. 5 illustrates a block diagram of a second system in accordance with an embodiment.

FIG. 5 shows a block diagram of a first more specific exemplary system 500 in accordance with an embodiment. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high-performance interface 539. In one embodiment, the coprocessor 538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present invention is not so limited.

As shown in FIG. 5, various I/O devices 514 may be coupled to first bus 516, along with a bus bridge 518 that couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device that may include instructions/code and data 530, in one embodiment. Further, an audio I/O 524 may be coupled to the second bus 520. Note that other architectures are possible. For example, instead of the point-to-point architecture of FIG. 5, a system may implement a multi-drop bus or other such architecture.

Figure 6:
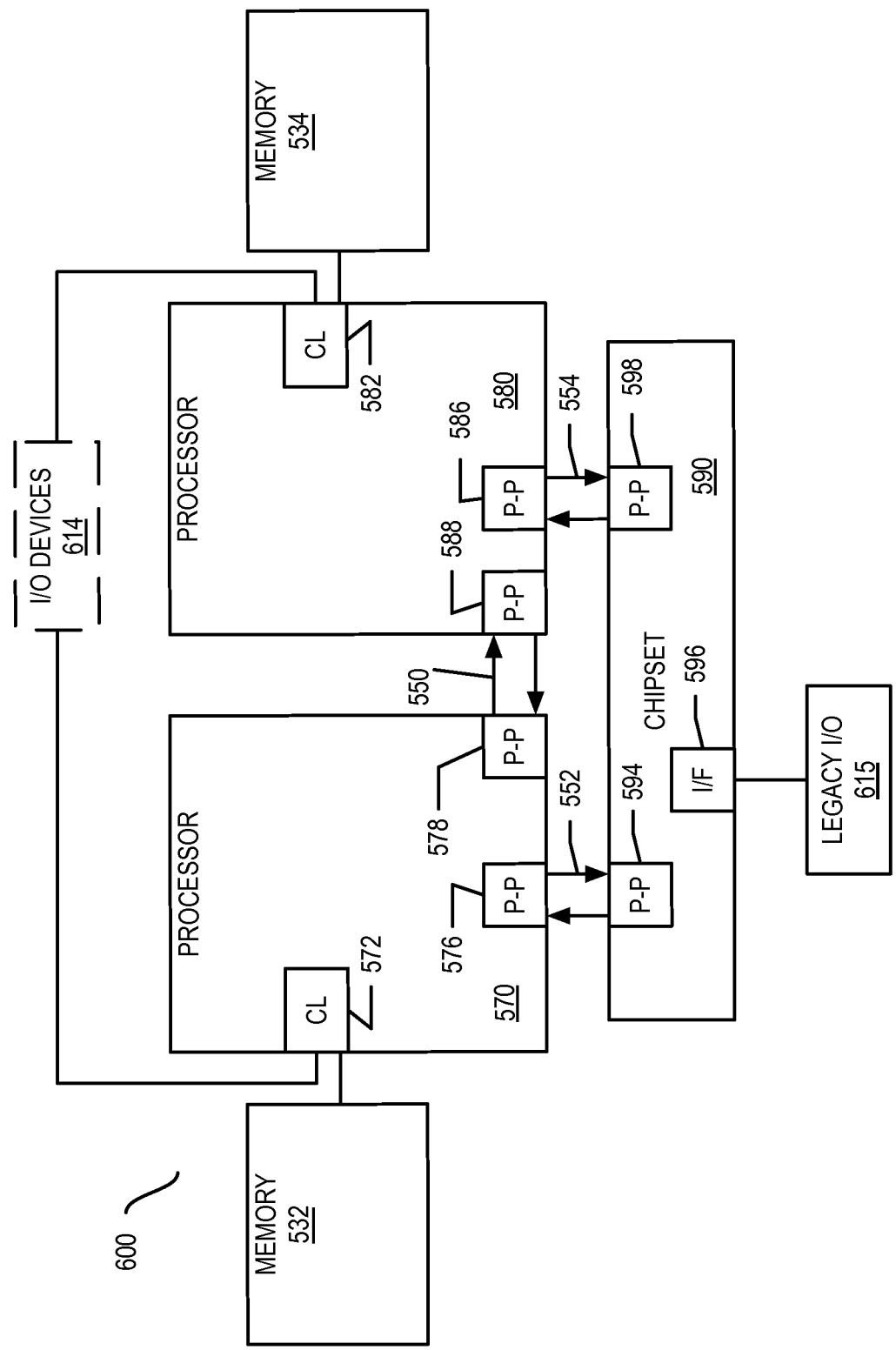
FIG. 6 illustrates a block diagram of a third system in accordance with an embodiment.

FIG. 6 shows a block diagram of a second more specific exemplary system 600 in accordance with an embodiment. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 572 and 582, respectively. Thus, the CL 572, 582 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
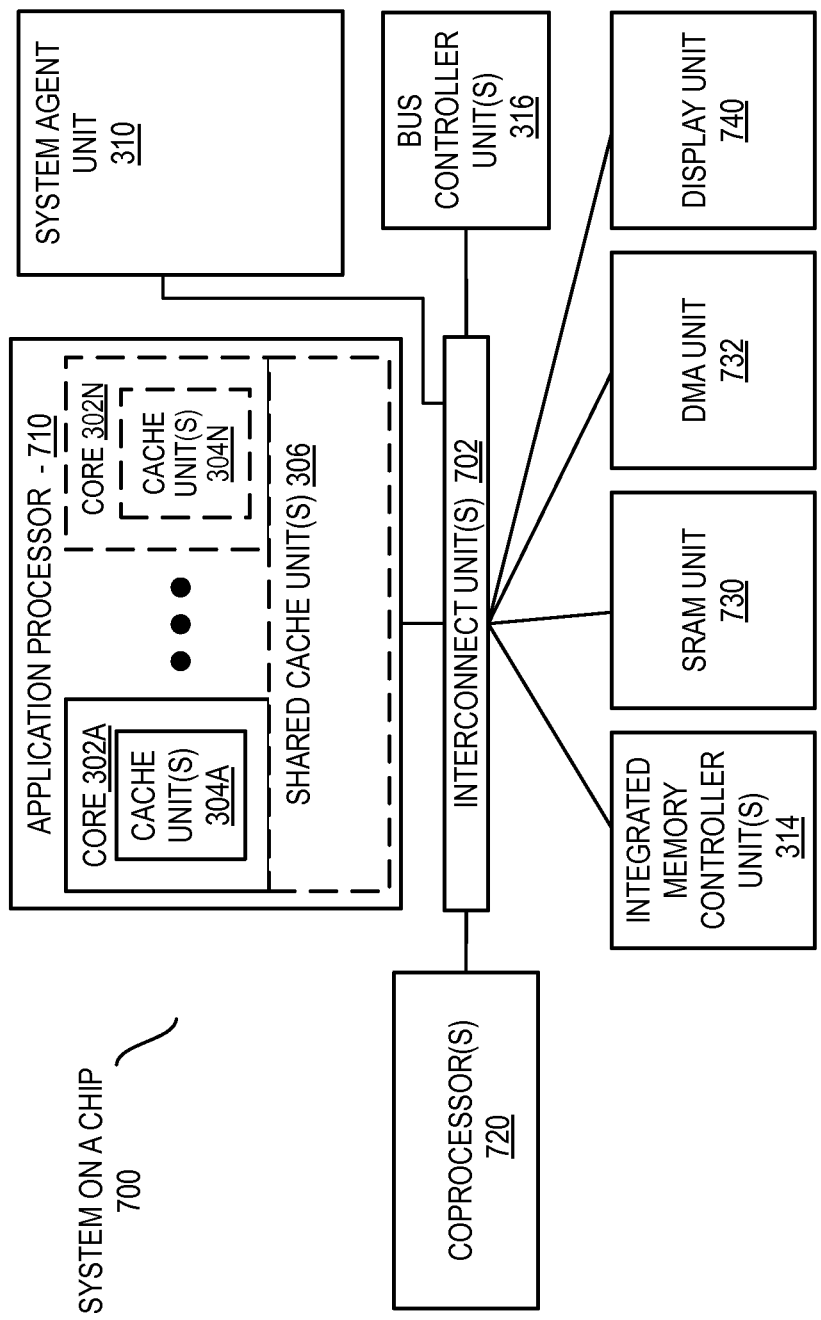
FIG. 7 illustrates a block diagram of a system on a chip (SoC) in accordance with an embodiment.

FIG. 7 shows a block diagram of a SoC 700 in accordance with an embodiment. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 202A-N and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein are implemented in hardware, software, firmware, or a combination of such implementation approaches. Embodiments are implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative code stored on a machine-readable medium that represents and/or defines logic within an integrated circuit such as a processor. For example, the machine-readable medium may include instructions that represent logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit.

The hardware model may be supplied to various customers or manufacturing facilities, which load the hardware model on fabrication machines that manufacture the integrated circuit. The integrated circuit may be fabricated such that the circuit performs operations described in association with any of the embodiments described herein. For example, IP cores, such as processors developed by ARM Holdings, Ltd. and the Institute of Computing Technology (ICT) of the Chinese Academy of Sciences may be licensed or sold to various customers or licensees and implemented in processors produced by these customers or licensees.

Accordingly, embodiments include non-transitory, tangible machine-readable media containing instructions or containing design data, such as Hardware Description Language (HDL), which defines structures, circuits, apparatuses, processors and/or system features described herein. Non-transitory machine-readable media includes, without limitation, non-transitory, tangible arrangements of articles manufactured or formed by a machine or device, including storage media such as hard disks, any other type of disk including floppy disks, optical disks, compact disk read-only memories (CD-ROMs), rewritable compact disks (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
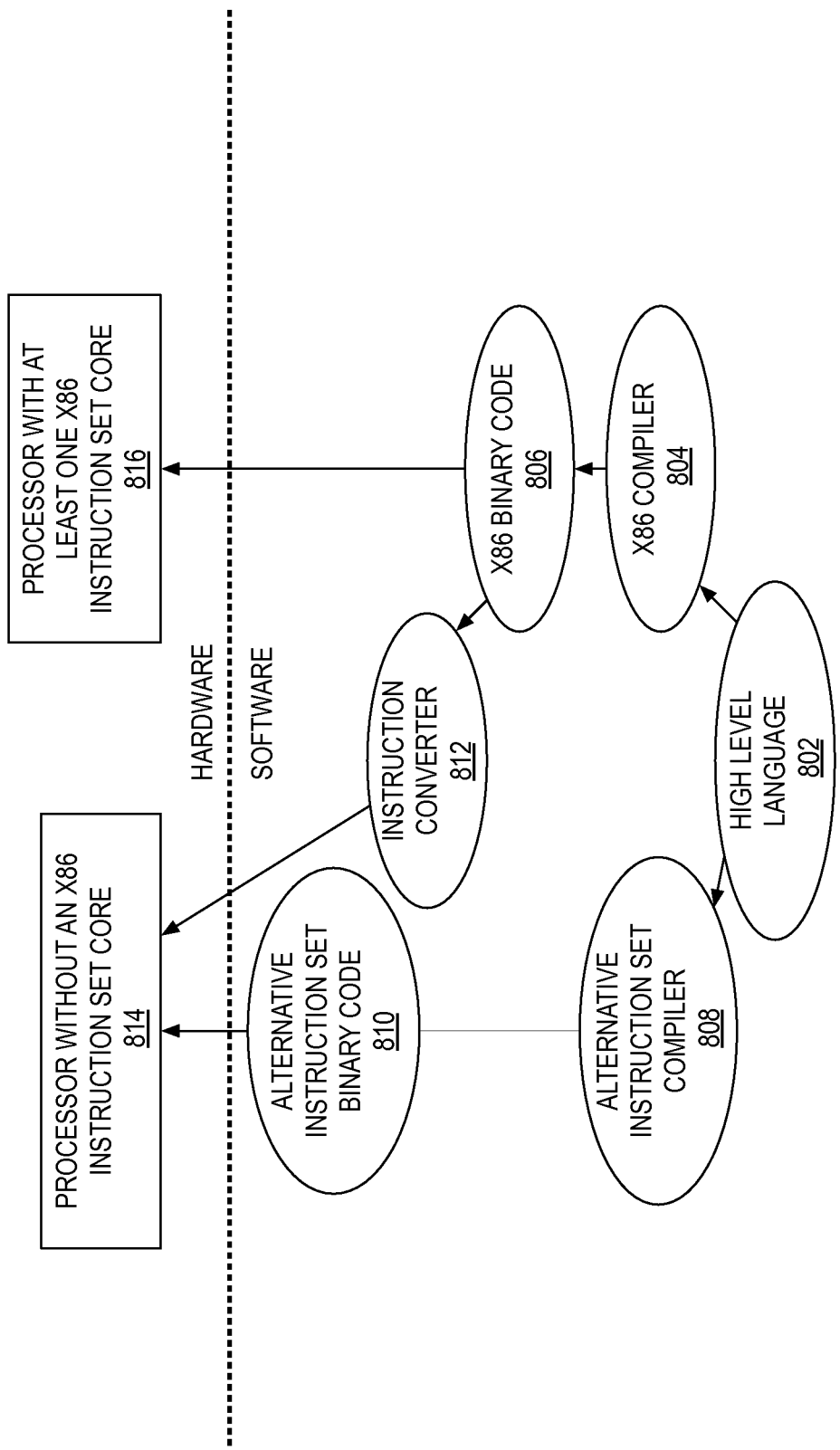
FIG. 8 illustrates a block diagram contrasting the use of a software instruction converter to convert binary instructions in a source instruction set to binary instructions in a target instruction set according to embodiments.

FIG. 8 is a block diagram contrasting the use of a software instruction converter to convert binary instructions in a source instruction set to binary instructions in a target instruction set according to an embodiment. In the illustrated embodiment, the instruction converter is a software instruction converter, although alternatively the instruction converter may be implemented in software, firmware, hardware, or various combinations thereof. FIG. 8 shows a program in a high level language 802 may be compiled using an x86 compiler 804 to generate x86 binary code 806 that may be natively executed by a processor with at least one x86 instruction set core 816.

The processor with at least one x86 instruction set core 816 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 804 represents a compiler that is operable to generate x86 binary code 806 (e.g., object code) that can, with or without additional linkage processing, be executed on the processor with at least one x86 instruction set core 816. Similarly, FIG. 8 shows the program in the high level language 802 may be compiled using an alternative instruction set compiler 808 to generate alternative instruction set binary code 810 that may be natively executed by a processor without at least one x86 instruction set core 814 (e.g., a processor with cores that execute the MIPS instruction set of MIPS Technologies of Sunnyvale, Calif. and/or that execute the ARM® instruction set of ARM Holdings of Cambridge, England).

The instruction converter 812 is used to convert the x86 binary code 806 into code that may be natively executed by the processor without an x86 instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have an x86 instruction set processor or core to execute the x86 binary code 806.

Figure 9:
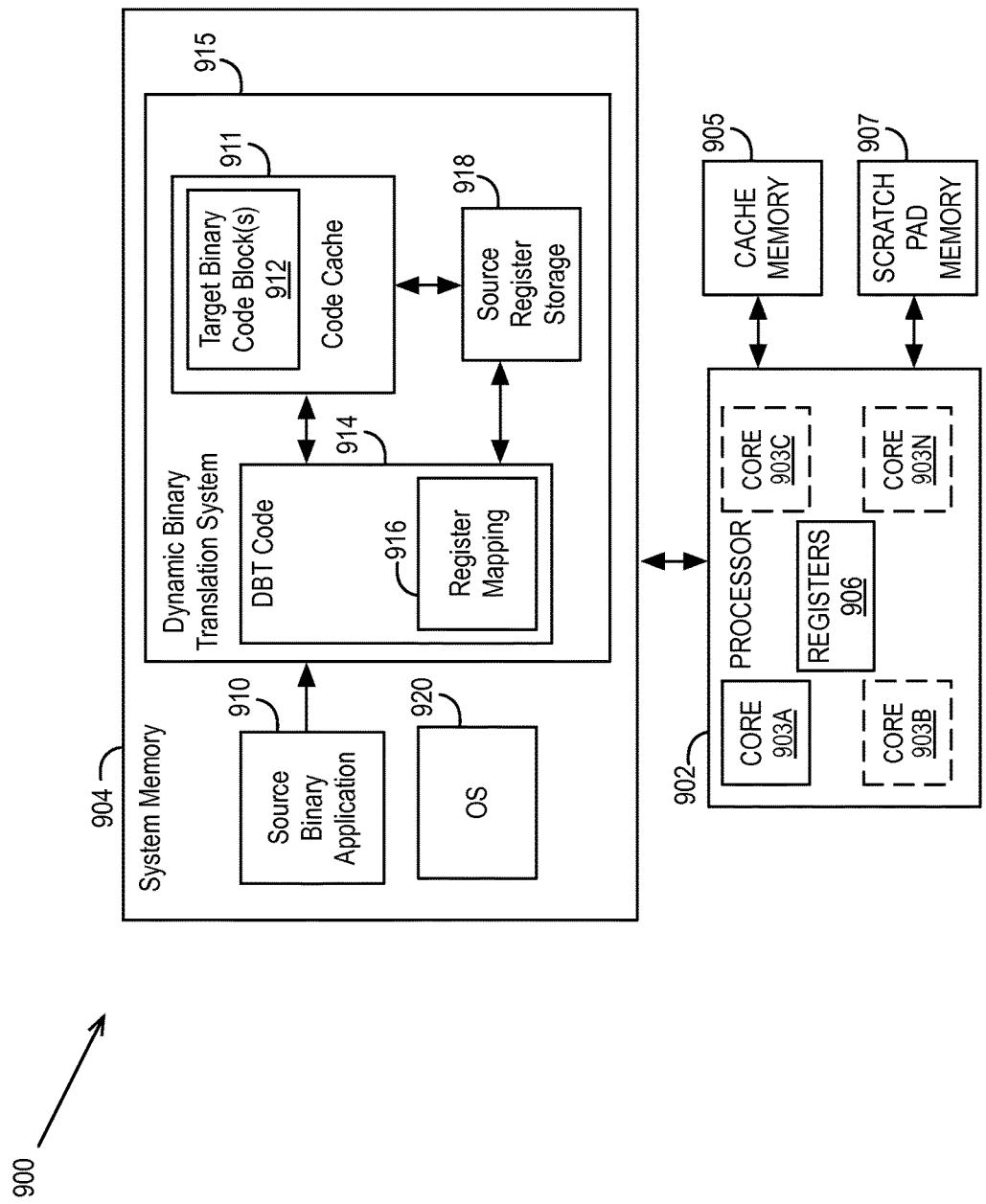
FIG. 9 is a block diagram of a computing system including a dynamic binary translation system, according to an embodiment.

In one embodiment, a binary translation system may be configured to translate and/or optimize instruction sequences in program object code during runtime operation. FIG. 9 is a block diagram of a computing system 900 including a dynamic binary translation system 915, according to an embodiment. The system 900 includes a processor 902 coupled to system memory 904. In one embodiment the system 900 additionally includes cache memory 905 (e.g., data cache unit 174 or the L2 cache unit 176 of FIG. 1) and scratchpad memory 907 coupled with or integrated within the processor 902. The processor 902 includes and a set of physical registers 906 and a one or more core processing units (e.g., core 903A-N). In one embodiment, each of the core processing units is configured to execute multiple simultaneous threads.

The system memory 904 may host a source binary application 910, the dynamic binary translation system 915 and a host operating system ("OS") 920. The dynamic binary translation system 915 may include blocks of target binary code 912, dynamic binary translator code 914 including a register mapping module 916 and/or source register storage 918. The source binary application 910 includes a set of source binary code blocks, which may be assembled low-level code or compiled high-level code. A source binary code block is a sequence of instructions that may include branching logic including increment, compare, and jump instructions.

In one embodiment the target binary code block(s) 912 are stored in an area of system memory designated a code cache 911. The code cache 911 is used as storage for target binary code block(s) 912 that have been translated from one or more corresponding blocks of source binary code block. The system memory 904 may host source register storage 918 configured to load/store data to/from processor registers 906. In some embodiments, cache memory 905 and/or scratch-pad memory 907 are configured to load/store data to/from processor register(s) 906.

In one embodiment the dynamic binary translator code 914 and register mapping module 916 are executed by one or more cores to operate on source binary application 910 to transform block(s) of source binary application 910 into target binary code block(s) 912. The target binary code block(s) 912 are configured to include the functionality of a corresponding source binary code block of the source binary application 910. In various embodiments, the dynamic binary translation system 915 performs operations including translating a source binary application 910 between instruction sets, as discussed with respect to FIG. 8, and/or performing runtime binary optimizations to a binary source application 910. While a dynamic binary translation system 915 is illustrated, in one embodiment, static binary translation is performed on a source binary application 910 before execution to create an optimized binary.

Optimized Mode Transitions Through Predicting Target State

In embodiments described herein, software executing on a data processing system that is capable of dynamic 32-bit to 64-bit transitions realize performance improvements by predicting transitions between modes. Such prediction can allow the processor to begin and early transition into the target mode. While a misprediction penalty exists should the processor mispredict the transition, under some circumstances the misprediction penalty is reduced because the pipeline flush that occurs during misprediction recovery is also required when performing a mode transition. The mode transition prediction principles described with respect to 32/64-bit mode transitions can also be applied for other mode transitions (e.g. interrupts, exceptions, traps, other instructions, etc.).

Exemplary Execution Environment

Some of the concepts described herein are illustrated using exemplary processor architectures. However, these concepts may be implemented in processors having various architectures and microarchitectures and are not limited to any one processor design or implementation. For example, the concepts described may be applicable to processors using various microarchitectures or instruction set architectures.

Figure 10:
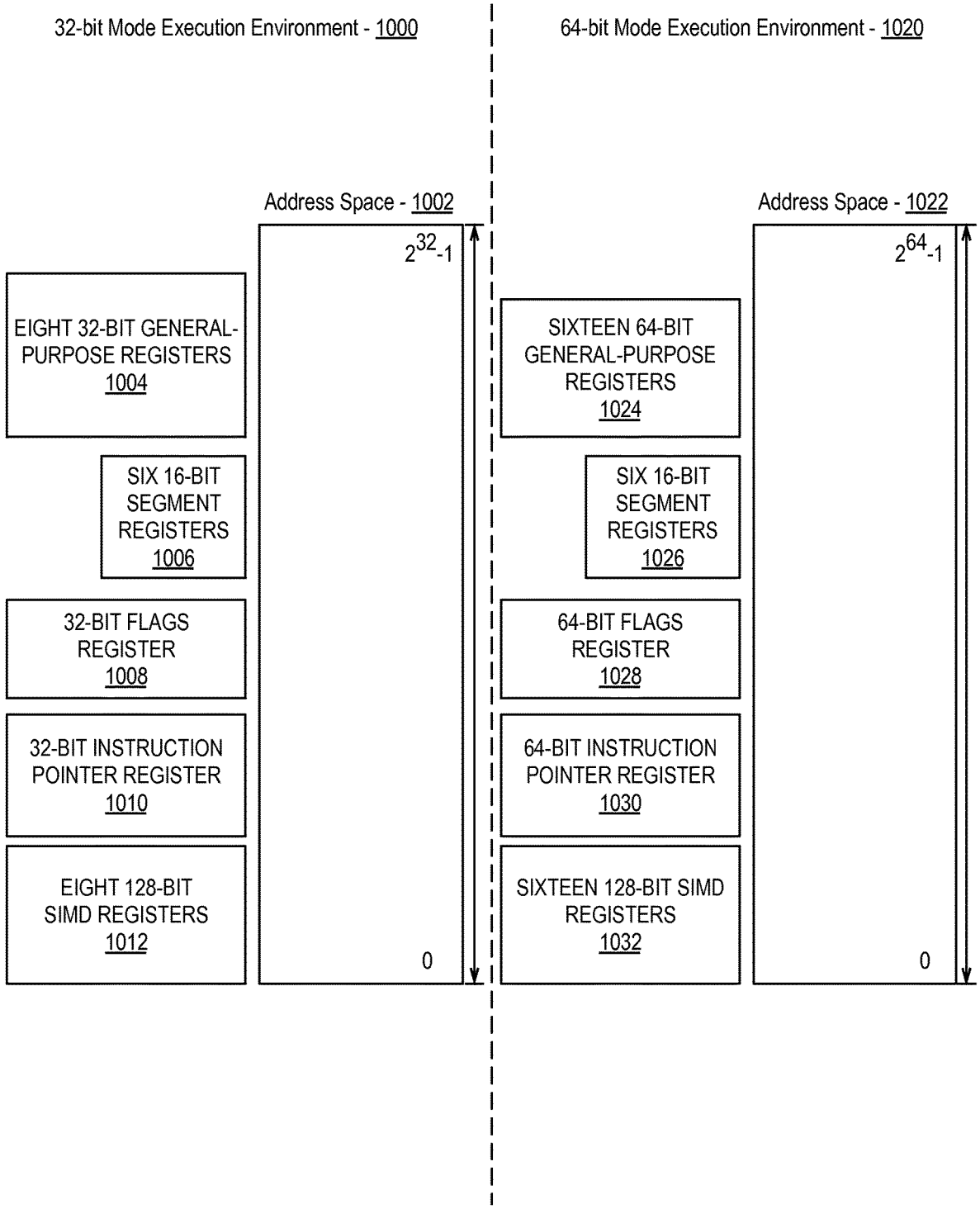
FIG. 10 is a block diagram of exemplary execution environments, according to an embodiment.

FIG. 10 is a block diagram of exemplary execution environments, according to an embodiment. The registers shown in the execution environments are exemplary, and some embodiments include additional registers (e.g., floating point data registers, control registers, status registers, etc.) that are not shown. In one embodiment a 32-bit mode execution environment 1000 presents an address space 1002 of four gigabytes (e.g., between 0 and $2^{32}-1$ bytes). However, some embodiments are able to address additional physical memory in excess of four gigabytes via various extended physical addressing modes. Additionally, the 32-bit mode execution environment 1000 presents eight 32-bit general-purpose registers 1004, six 16-bit segment registers 1006, a 32-bit flags register 1008, and a 32-bit instruction pointer register 1010, which comprise a basic execution environment in which to execute a set of general-purpose instructions. The general-purpose instructions perform basic integer arithmetic on byte, word, and doubleword integers, handle program flow control, operate on bit and byte strings, and address memory. In one embodiment, an additional eight 128-bit single instruction multiple data (SIMD) registers are provided for use by data parallel instructions that perform operations for a single instruction across multiple channels of data.

In one embodiment, a 64-bit mode execution environment 1020 presents an address space 1022 of eighteen exabytes (e.g., between 0 and $2^{64}-1$ bytes). However, some embodiments are limited to a smaller amount of physical memory. Additionally, the 64-bit mode execution environment 1020 presents sixteen 64-bit general-purpose registers 1024, six 16-bit segment registers 1026, a 64-bit flags register 1028, and a 64-bit instruction pointer register 1030. In one embodiment, the 64-bit mode execution environment also provides sixteen 128-bit SIMD registers.

In one embodiment, a processor has support for the 64-bit mode execution environment 1020, as well as compatibility mode in which 32-bit software may be executed in an execution environment resembling the 32-bit mode execution environment 1000. In one embodiment 16-bit software may also run in compatibility mode. Such configuration allows a data processing system to execute a 64-bit operating system that provides support for both 64-bit and 32-bit programs, in which programs compiled for 64-bit operation execute in the 64-bit mode execution environment 120 and applications compiled for 32-bit operation execute in the 32-bit mode execution environment 1000.

Figure 11:
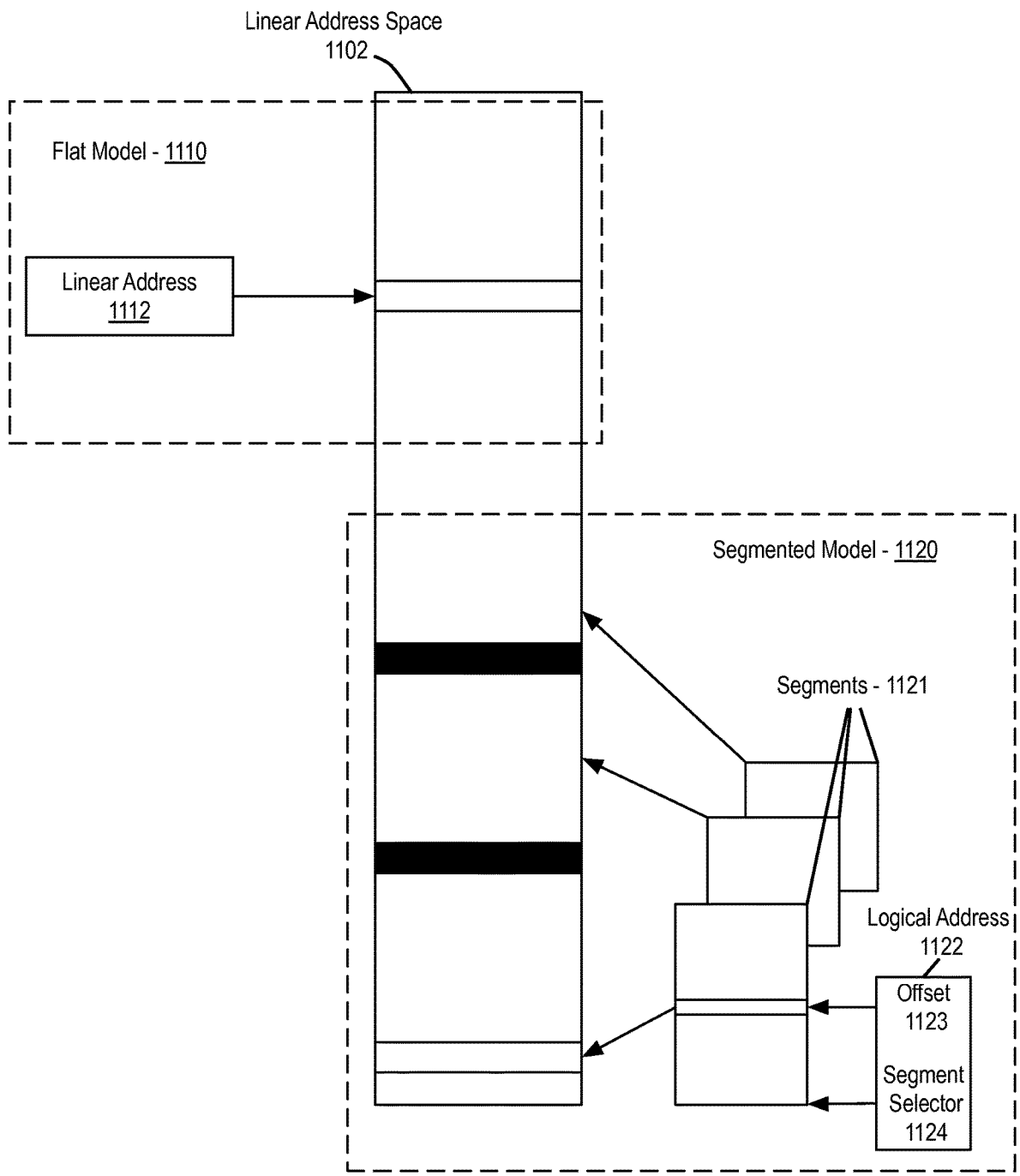
FIG. 11 is a block diagram of exemplary memory management models according to an embodiment.

FIG. 11 is a block diagram of exemplary memory management models 1100 according to an embodiment. In one embodiment, physical memory within a data processing system is organized as a sequence of 8-bit bytes. Each byte is assigned a unique address, which is the physical address. A processor accesses memory on the processor memory bus using physical addresses. Generally, software executing on a processor does not directly address physical memory. Instead, memory management capabilities within the processor are used to present a linear address space 1102 to executing software. The processor can present one of several memory management models to executing software, including a flat model 1110 or a segmented model 1120. In the flat model 1110, memory appears to a program as a single, continuous address space that includes all of the code, data, stacks, and other portions of memory used by the program during execution. An address for any byte in linear address space is a linear address 1112.

In one embodiment, processors additionally support a segmented model 1120. In the segmented model, memory appears to a program as a group of independent address spaces called segments 1121. Code, data, and stacks are typically contained in separate segments. To address a byte in a segment, a program issues a logical address 1122 consisting of an offset 1123 and an optional segment selector 1124, where the offset 1123 identifies a byte in the address space of the segment and the optional segment selector 1124 identifies the segment to be accessed. When performing a far transfer (e.g., far call, far return, etc.), a logical address 1122 can be specified including a segment selector 1124. The segment selector 1124 can indicate the new code segment descriptor. Alternatively, the segment selector 1124 can indicate another segment type, like a call gate, task gate, or a new task state segment (TSS). The new segment descriptor may directly specify attributes of the target mode (e.g. new CS segment, new current privilege level (CPL), new default operand size, etc.), or may indirectly specify attributes of the target mode (e.g. by specifying a new CPL which indicates where to load a new stack segment selector).

In one embodiment, the segments define the mapping between logical addresses 1122 and linear addresses 1112. To access a memory location, the processor translates each logical address 1122 into a linear address 1112 as used in the flat model 1110. In one embodiment, paging and virtual memory can be applied to both the flat model 1110 and the segmented model 1120. When paging is enabled, the linear address space 1102 is divided into pages that are mapped to virtual memory addresses. The pages of virtual memory are then mapped as needed into physical memory.

FIG. 12 is a block diagram of segment register usage 1200 for the exemplary memory models. In the segmented model 200, each segment register 1202A holds a 16-bit segment selector that is associated with a code or data segment. A code segment register (e.g., CS) identifies the code segment 1204 for a program, which includes instructions to be executed for the program. The processor fetches instructions from the code segment 1204 using a logical address that consists of the segment selector in the CS register and the contents of the instruction pointer register, which contains the offset within the code segment of the next instruction to be executed. A stack segment register (e.g., SS) contains the segment selector for the stack segment 1206, which is where the procedure stack is stored for the program currently being executed. Additionally, four data segment registers are provided, (e.g., DS, ES, FS, and GS), which point to four data segments 1208A-D. Programs can load the data segment registers and stack segment registers as needed, but cannot directly modify the code segment register, which is instead implicitly modified by control flow instructions.

In one embodiment, in the flat model 1110 the segment registers 1202B are all assigned a segment base of zero, creating overlapping segment registers that can extend up to the maximum linear address for the operating mode. Memory model configuration options can differ depending on the operational mode of the processor. In one embodiment, the segmented model 1120 is generally available for programs executing in 32-bit mode or compatibility mode. In one embodiment, for programs executing in 64-bit mode segmentation is generally, but not completely disabled. For example, the segment bases for most segments are treated as zero and segment limits are ignored.

Protected Mode Segment Descriptors

In any of the memory management models described herein, the processor can be configured for protected mode memory access. In protected mode, the processor provides segment and/or page level protection to limit access to certain segments or pages (e.g., if paging is enabled) based on privilege levels. Each reference to memory in protected mode is checked to verify that it satisfies various protection checks before the memory cycle is started. In protected mode operation, the operating system executing on the processor can define segment descriptors to define attributes and protections for a segment. The segment descriptors can be created by the operating system memory manager and stored in a descriptor table in memory.

Figure 13:
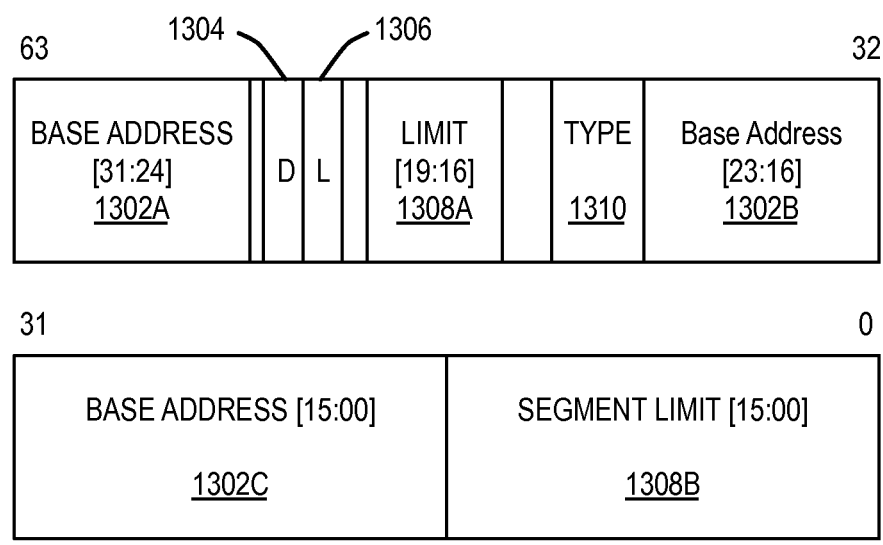
FIG. 13 is a block diagram of a segment descriptor for a code segment, according to an embodiment.

FIG. 13 is a block diagram of a segment descriptor for a code segment, according to an embodiment. The segment descriptor shown is exemplary and one skilled in the art will understand that segment descriptors, or equivalent metadata describing program segments in memory, may have more or fewer fields and flags than shown. Moreover, the fields and flags illustrated may be arranged differently depending on processor architecture or microarchitecture.

The exemplary code segment descriptor 1300 includes fields defining the base address 1302A-C and the upper address limit 1308A-B of the segment. Additionally, a type 1310 field is included to identify the type of the segment described by the descriptor (e.g., code, data, etc.). Other types of descriptors, such as data descriptors, may have different fields than shown in the exemplary code segment descriptor 1300. In one embodiment, the code segment descriptor 1300 specifically includes a default (e.g., D 1304) flag, which is used to define the default size for data and addresses within the segment, and a 64-bit (e.g., L 1306) flag, to indicate whether instructions in the described code segment are to be executed in 64-bit mode or 32-bit compatibility mode. In one embodiment, the default flag is used to select between 16-bit or 32-bit operands in compatibility mode.

In one embodiment, a processor uses the D 1304 flag and L 1306 flag of the code segment descriptor 1300 to resolve predicted operational mode changes. For example, the segment attributes for a new segment can be compared to attributes for the predicted code segment to discover, for example, the accuracy of a previously made prediction of an operational mode change.

In one embodiment, a code segment change may occur after the processor executes a 'far call' instruction. A far call is a call from a first set of instructions in a first code segment into a second set of instructions in a second, often different code segment. Far calls, as well as far jumps and far returns, involve loading a significant amount of state information for the target code segment, including, but not limited to data from the code segment descriptor 1300. Once the state information is loaded, the processor performs checks to ensure the validity of the state information (e.g., no reserved bits sets, appropriate descriptor type, etc.). Once the state information is validated, the processor can be configured according to the new state information. Once the processor is reconfigured, the processor is able to perform operations using the new state. In one embodiment, a processor pipeline flush or pipeline stall is used to complete pending operations under the old state before new operations are able to use the newly configured state. In one embodiment, pipeline stalls may be skipped if the operations using the old state are completed before the state reconfiguring occurs and/or the state reconfiguring completes before new operations need to use the newly configured state.

In one embodiment, a processor can predict specific configuration details associated with an upcoming operational mode change based on common segment configurations before loading all of the state information for a target code segment. For example, for some software runtimes, far calls, jumps, or returns executed by a processor while in 64-bit mode are frequently used to switch between executing 64-bit code and 32-bit code. Thus, executing a far call may involve an operational mode change between 64-bit mode and 32-bit compatibility mode. In one embodiment, when a processor is in a 64-bit capable mode (e.g., long mode, IA32e, etc.), the combination of the default (e.g., D 1304) flag and the 64-bit (e.g., L 1306) flag can be used to determine an addressing mode for a code segment, shown in Table 1 below.

TABLE 1

Exemplary Segment Addressing Mode.

| CS.D | CS.L | Addressing Mode |
|---|---|---|
| 1 | 1 | Reserved |
| 0 | 1 | 64-bit mode |
| 1 | 0 | 32-bit mode |
| 0 | 0 | 16-bit mode |

An analysis of modern operating systems indicates that operating systems frequently configure 32-bit code segments based on Table 1 above, with a default (e.g., D 1304, CS.D of Table 1) flag setting of 1 and a 64-bit flag (e.g., L 1306, CS.L of Table 1) of zero. The operating systems generally configure 64-bit code segments as the inverse of the 32-bit settings, with a default flag of 0 and a 64-bit flag of 1. In one embodiment, the processor additionally predicts that at least the code segment will be configured for a flat memory model, with a code segment base address of zero and a code segment limit extending to the top of the linear address space. In one embodiment the code segment base address and limit are ignored in 64-bit mode and incorrect predictions of these values do not need to be corrected if other predictions (e.g. the target mode being 64-bit) are correct.

Operational Mode Prediction Logic

Figure 14:
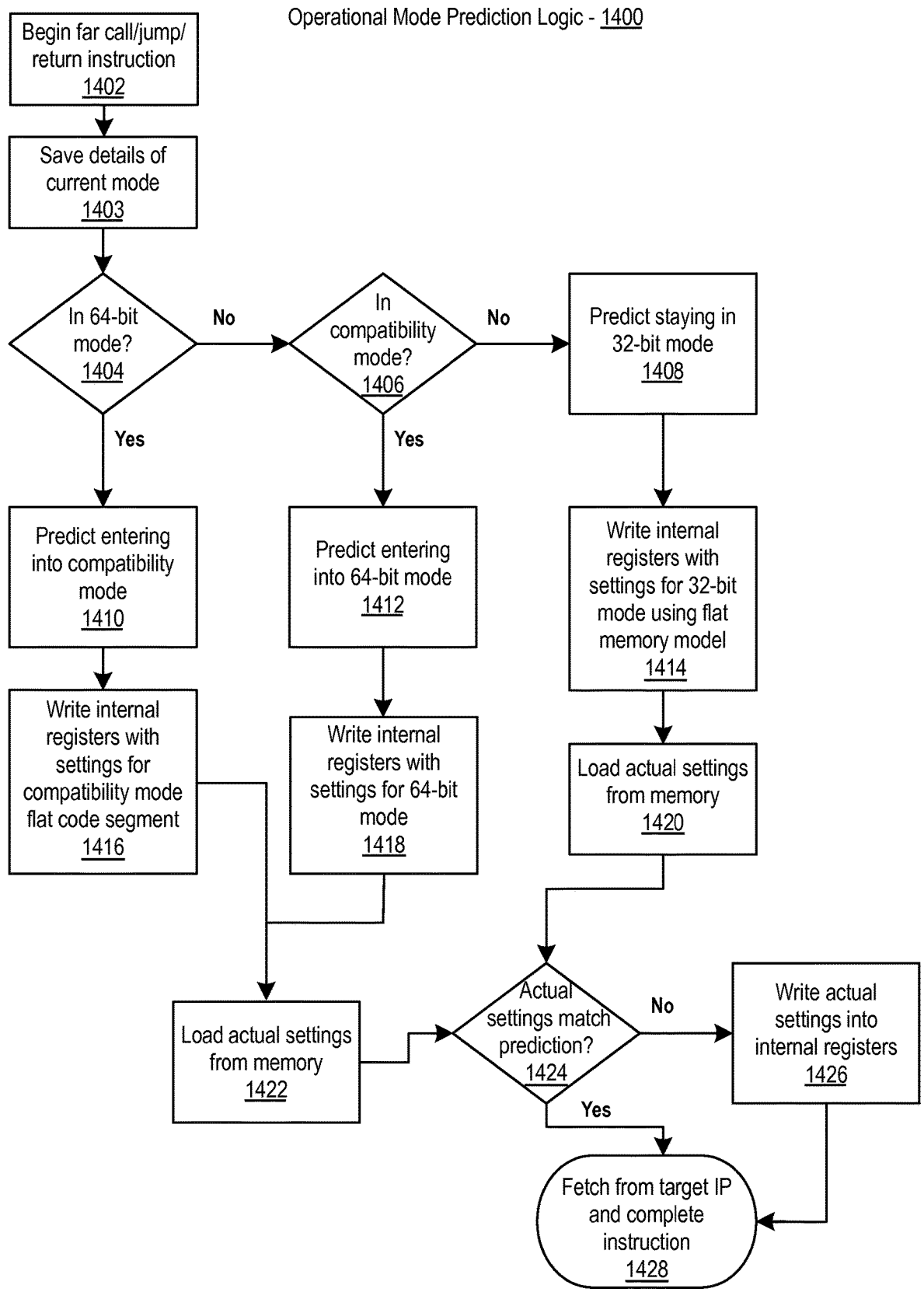
FIG. 14 is a block diagram of logic to predict an operational mode for a target branch, according to an embodiment.

FIG. 14 is a block diagram of logic to predict an operational mode for a target branch, according to an embodiment. In one embodiment, operational mode prediction logic 1400 performs operations to predict an operational mode associated with a branch target. In various embodiments, operational mode prediction logic 1400 can be implemented within a binary translation system (e.g., dynamic binary translation system 915 as in FIG. 9) or within a processor or processing system as described herein (e.g., processor 1555 as in FIG. 15).

In one embodiment, the operational mode prediction logic 1400 begins at block 1402, where operations begin to process a far transfer instruction such as a far call, far jump, far return instruction, or another instruction that may cause a control flow change to a different code segment. In one embodiment, the far transfer instruction is decoded and processed during speculative execution, for example, during branch prediction. The operational mode prediction logic 1400 can then save the details of the current operational mode, for example, by saving configuration information specified by the segment descriptor for the current code segment, as shown at block 1403. The operational mode prediction logic 1400 can then determine the current operational mode of the processor, as shown at block 1404 and block 1406.

In one embodiment, the operational mode prediction logic 1400 determines if the processor is currently configured for 64-bit mode, as shown at block 1404. If the processor is in 64-bit mode at block 1404, the operational mode prediction logic 1400 predicts entering into compatibility mode to execute the instructions at the branch target code segment, as shown at block 1410. Subsequently, as shown at block 1416, the logic 1400 can write internal registers of the processor with settings for a compatibility mode code segment. In one embodiment, the compatibility mode code segment is predicted to be a 32-bit code segment using a flat memory model with a base address of 0 and a limit of 0xffffffff. Furthermore, the default address and data flag for the code segment is predicted to have a value of one (e.g., CS.D=1) and the 64-bit flag is predicted to have a value of zero (e.g., CS.L=0). In one embodiment, the operational, mode prediction logic 1400 can determine if the code segment is already configured with a base address of 0 and segment limit of 0xffffffff and thus those fields do not need to be changed. Avoiding changing these fields may remove the need to stall/flush if the prediction was made correctly. Such a prediction can allow speculatively starting to fetch, decode, and/or execute new instructions in the targeted mode even before the load of the new segment descriptor complete.

If the processor is not in 64-bit mode at block 1404, in one embodiment the operational mode prediction logic 1400 determines if the processor is configured for compatibility mode, as shown at block 1406. If the processor is currently in compatibility mode at block 1406, the logic 1400 can predict entering into 64-bit mode at block 1412. Subsequently, as shown at block 1418, the logic 1400 can write internal registers of the processor with settings for a 64-bit mode operation. In one embodiment, settings for a 64-bit code segment include settings to configure a flat memory model, with a base address of zero, a default address and data flag value of zero (e.g., CS.D=0) and a 64-bit flag value of one (e.g., CS.L=1). In one embodiment, the processor ignores the limit value for the code segment in 64-bit mode. However, in some embodiments, a limit value of 0xffffffff is still set for 64-bit segments, as it is possible for 32-bit code operating in compatibility mode to load a segment created by or configured for use by 64-bit code. In such embodiments, software cannot determine the actual value of the segment limit and setting or maintaining a limit value of 0xffffffff in 64-bit mode may speed up future transitions back to compatibility mode.

If the processor is not in 64-bit mode at block 1404 or compatibility mode at block 1406, in one embodiment the operational mode prediction logic 1400 determines that the processor is currently operating in a non-compatibility 32-bit mode and, at block 1408, predicts that the processor will stay in such mode. In one embodiment, as shown at block 1414, the logic 1499 predicts the memory model of the branch target will be a flat memory model and configures the processor accordingly. In one embodiment, a code segment configured for a 32-bit flat memory model includes code segment settings equivalent to those predicted for compatibility mode (e.g., base of 0, limit of 0xffffffff, CS.D=1, CS.L=0). However, settings for 32-bit mode may differ from compatibility mode in some processor architectures. Additionally, while a 32-bit flat memory model is predicted in one embodiment, other embodiments of the operational mode prediction logic 1400 may predict maintaining any currently configured segmented memory model if a segmented model is currently in use, or may predict switching between 16-bit and 32-bit flat segment modes. Additionally, while the processor is able to execute 32-bit code in compatibility mode, one embodiment supports execution of code configured or compiled for use on a 16-bit processor while in compatibility mode. In one embodiment, the predictions may be performed at least in part using a predictor structure to maintain a history of predicted operations. The predictor structure may be indexed using the instruction pointer of the far transfer instruction, the target instruction pointer, or recent behavior of similar operations.

In one embodiment, the operational mode prediction logic 1400 configures the processor to load the actual settings configured for the code segment of the branch target in parallel with writing the predicted settings for the branch target code segment. For example, in parallel with writing internal registers for the predicted operational mode at of block 1416 or block 1418, the processor can be configured to load actual settings for the branch target code segment from memory at block 1422. In parallel with writing internal registers for the predicted operational mode at of block 1420, the processor can be configured to load actual settings for the branch target code segment from memory at block 1420. In one embodiment, loading the actual settings from memory may sometimes be a higher latency task than writing the predicted settings to internal registers, for example, when the load operation results in a cache or TLB miss. In one embodiment, the processor may be configured to speculatively fetch, decode, and/or execute instructions from the branch target based on the newly configured mode, including performing any needed page walks and instruction cache loads.

In one embodiment, the operational mode prediction logic 1400, after loading the actual settings for the target code segment from memory at block 1422, can determine if the actual settings for the code segment matches the predicted settings, as shown at block 1424. If the actual settings match the predicted settings at block 1424, at block 1428 the processor can be configured to fetch instructions from the target instruction pointer (IP), or continue to fetch instructions in the event of speculative execution. At block 1428, the processor also performs operations to complete the far transfer instruction.

If at block 1424 the actual settings do not match the predicted settings, the operational mode prediction logic 1400 can configure the processor to write the actual settings loaded from memory into internal registers of the processor at block 1426. Once the processor is configured to use the actual settings, the processor can fetch instructions from the target IP and complete operations for the far call, jump, return, or other instruction that causes a change in processor operational mode at block 1428.

In one embodiment, at block 1424 the operational mode prediction logic 1400 allows the processor to continue operation even if the actual settings do not match the predicted settings if the differences do not affect instruction operation. For example, in one embodiment the code segment base and limit may not be observable to OS software in 64-bit mode.

In one embodiment, the operational mode prediction logic 1400 is performed by hardware within a processor, for example, within, or in conjunction with branch prediction logic of a processor (e.g., branch prediction unit 132 as in FIG. 1), although applications are not limited to branch prediction. In one embodiment the operational mode prediction logic 1400 is performed by binary translation software (e.g., binary translation system 915 as in FIG. 9). In general, operations performed by the operational mode prediction logic 1400 can be used to increase processor performance when performing mode transitions. While FIG. 14 illustrates mode transitions between 64-bit mode and 32-bit mode based on far call, jump or return instructions, other mode transitions can be predicted by equivalent logic. For example, mode transitions can be predicted when handling a processor interrupt, exception, trap, or similar processor operations that may involve a change in operational mode. When performed in conjunction with binary translation, the operational mode prediction logic 1400 can be used when translating a binary between processor architectures or instruction sets. Additionally, binary translator implementations may perform other speculative operations based on the predictions described herein, such as speculatively configuring a segment descriptor for a branch target code segment.

Exemplary Processor Implementation

Figure 15:
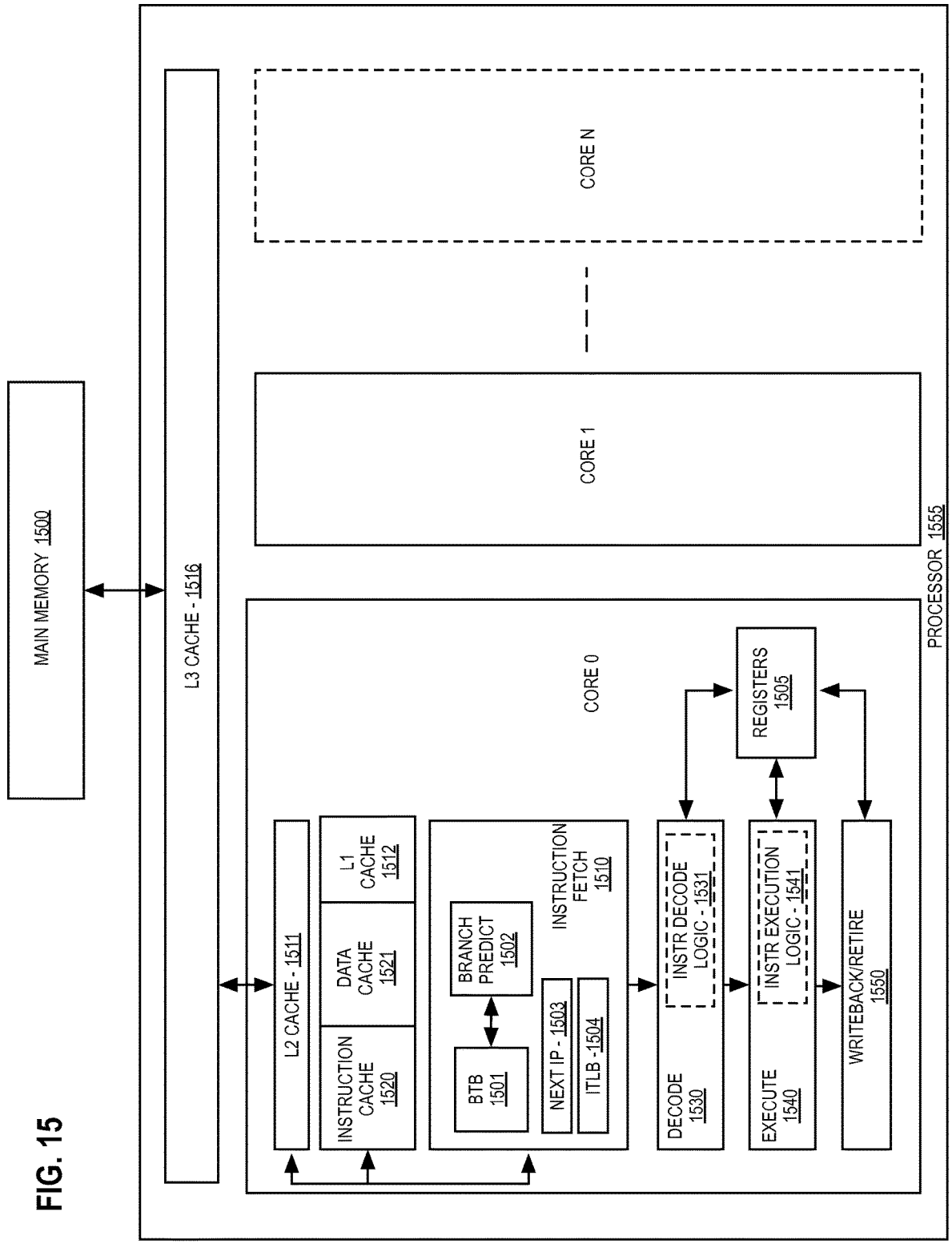
FIG. 15 is a block diagram of a processing system including logic to predict an operational mode for a target branch, according to an embodiment.

FIG. 15 is a block diagram of a processing system including logic to predict an operational mode for a target branch, according to an embodiment. The processing system can include any system that has a processor, such as, for example, a digital signal processor (DSP), a microcontroller, an application specific integrated circuit (ASIC), or a microprocessor. The exemplary processing system includes a processor 1555 coupled to main memory 1500. The processor 1555 includes a decode unit 1530 with decode logic 1531 for decoding control flow instructions (e.g., jump, call, branch, return, etc.) that change the instruction pointer (e.g., next IP 1503) of the processor 1555. A processor execution engine unit 1540 includes additional execution logic 1541 to execute the control flow instructions.

Registers 1505 provide register storage for operands, control data and other types of data as the execution unit 1540 executes an instruction stream. The registers 1505 include architecture registers that are usable from the outside of the processor, as well as internal registers that are used by the processor. The registers 1505 can be implemented by circuitry within a processor using any number of different techniques, such as dedicated physical registers, dynamically allocated physical registers using register renaming, combinations of dedicated and dynamically allocated physical registers, etc. The registers 1505 also include configuration registers that are used to configure an operational mode for the processor.

The details of a single processor core ("Core 0") are illustrated in FIG. 15 for simplicity. It will be understood, however, that each core shown in FIG. 15 may have the same set of logic as Core 0. As illustrated, each core may also include a dedicated Level 1 (L1) cache 1512 and Level 2 (L2) cache 1511 for caching instructions and data according to a specified cache management policy. The L1 cache 1511 includes a separate instruction cache 1520 for storing instructions and a separate data cache 1521 for storing data. The instructions and data stored within the various processor caches are managed at the granularity of cache lines, which may be a fixed size (e.g., 64, 128, 512 Bytes in length). Each core of this exemplary embodiment has an instruction fetch unit 1510 for fetching instructions from main memory 1500 and/or a shared Level 3 (L3) cache 1516; a decode unit 1530 for decoding the instructions; an execution unit 1540 for executing the instructions; and a write back/retire unit 1550 for retiring the instructions and writing back the results.

The instruction fetch unit 1510 includes various well known components including a next instruction pointer 1503 for storing the address of the next instruction to be fetched from memory 1500 (or one of the caches); an instruction translation look-aside buffer (ITLB) 1504 for storing a map of recently used virtual-to-physical instruction addresses to improve the speed of address translation; a branch prediction unit 1502 for speculatively predicting instruction branch addresses; and branch target buffers (BTBs) 1501 for storing branch addresses and target addresses. In one embodiment, the code segment data associated with the branch and target addresses can be used to predict a change in processor operational mode. Once fetched, instructions are then streamed to the remaining stages of the instruction pipeline including the decode unit 1530, the execution unit 1540, and the write back/retire unit 1550.

In one embodiment the processor 1555 includes logic to predict an impending operational mode change. The operational mode change logic (e.g., operational mode prediction logic 1400) can be configured to predict an operational mode change in association with, for example, a branch, jump, return, or other control flow change that results in a change to an operational mode of a processor within the processing system. In various embodiments, the operational mode prediction logic may be implemented as micro-coded control logic, as hardwired control logic, or a combination of microcode and hardwired logic. The control logic may also be implemented within, or in association with the branch prediction unit 1502, instruction fetch unit 1510, or decode unit 1530, although embodiments are not limited to any specific hardware implementation.

Figure 16:
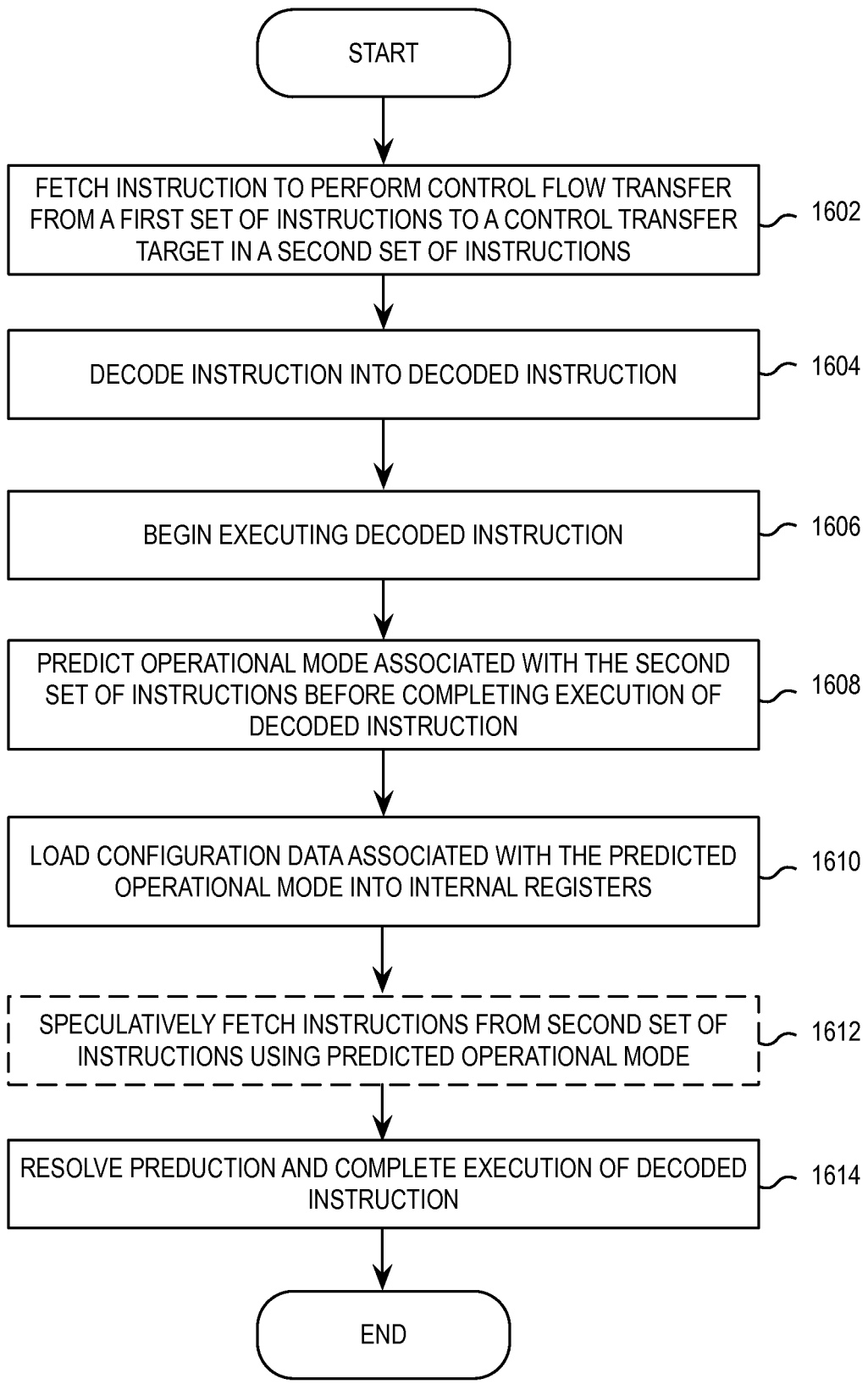
FIG. 16 is a flow diagram of processing system logic to predict an operational mode for a target branch, according to an embodiment.

FIG. 16 is a flow diagram of processing system logic to predict an operational mode for a target branch, according to an embodiment. In one embodiment the processing system includes logic to fetch an instruction to perform a control flow change (e.g., control flow transfer) from a first set of instructions to a control flow transfer target in a second set of instructions, as shown at block 1602. In one embodiment the first set of instructions is in a first code segment and the second set of instructions is in a second code segment, however embodiments are not so limited. Moreover, the logic is not limited explicitly to processor code segments, for example, as defined by a processor segment register. In one embodiment, differing software defined code segments may store differing blocks of executable instructions that utilize differing processor configurations or require differing processor operational modes. Thus, the instruction to perform the control flow transfer may be any one of a plurality of processor control flow instructions that causes a change to the value of a processor instruction pointer. Exemplary instructions include, but are not limited to a jump instruction, a call instruction, a branch instruction or a return instruction. In one embodiment, the instruction can explicitly or implicitly cause a control flow change in association with one or more of an interrupt, trap, exception, or any other asynchronous or synchronous event that may include a change in processor operational mode.

After fetching the instruction, the processing system can then decode the instruction into a decode instruction as shown at block 1604. Subsequently, at least one processor within the processing system can begin executing the decoded instruction, as shown at block 1606. While executing the decoded instruction, the processing system can predict an operational mode associated with a control flow transfer target before completing execution of the decoded instruction, as shown at block 1608. In one embodiment, the operational mode prediction is based on the configuration of the first set of instructions, which reflects the operational mode of the processing system before beginning to execute the control flow transfer. For example, and in one embodiment, the processing system predicts the operational mode using logic similar to operational mode prediction logic 1400 as in FIG. 14. In one embodiment, the target operational mode is predicted based upon a target address of the control flow transfer. In one embodiment, the target operational mode is predicted based upon a prediction history. For example, the processing system can maintain a history of past behavior (e.g., using a predictor structure). The past behavior includes operational mode changes and/or predictions associated with a specific control flow transfer instruction or based on instructions that perform similar operations. In one embodiment, the operational mode prediction is based upon a history of a set of operations having a similar type (e.g., return instruction, interrupt operations, conditional or unconditional branch instructions, etc.). Once the upcoming operational mode is predicted, the processor can write the predicted configuration to internal registers of at least one processor within the processing system, as shown at block 1610.

In one embodiment, the processing system may not fetch from the control flow target until after the processing system resolves the prediction and completes execution of the decoded instruction, as shown at block 1614. In one embodiment, the processing system may speculatively fetch from the control flow target using the predicted operational mode configuration, as shown at block 1612. Speculatively fetching instructions can enable the processor to perform additional operations to reduce the latency imposed upon the processor by the operational mode change. For example, a processor in the processing system can pre-load an instruction cache with instructions at the control flow target, or perform other speculative fetching operations. In one embodiment the processing system may speculatively fetch and decode instructions from the control flow target before the prediction is resolved. In one embodiment, the processing system may speculatively fetch, decode, and begin to execute instructions. However, speculatively executed instructions are not allowed to retire until after resolving the prediction and completing execution of the decoded instruction at 1614.

In one embodiment, resolving the prediction at block 1614 includes loading the actual settings for the target code segment from memory and comparing the actual settings with the predicted settings. In the event of a misprediction, the processing system can write the actual settings into internal registers of the processor and, in one embodiment, flush the processor pipeline and discard any speculate operations (e.g., instruction fetches) performed using the mispredicted configuration. In one embodiment, mispredicting the impending occurrence or non-occurrence of an operational mode change may incur a performance penalty.

Under some circumstances and in some embodiments the misprediction penalty may be reduced in the event an operational mode change is required to execute instructions at the control flow target. For example, a pipeline flush can occur both during recovery from a misprediction and when performing the operational mode change. The misprediction pipeline flush can help ensure that the younger operations, which write the correct mode, will execute after the older operations, which wrote the incorrect predicted mode. Accordingly, operations to write the correct mode do not require pre-serialization, as the pipeline serialization is performed by the misprediction recovery. However, post-serialization of operations for the new mode may still be performed so that fetch, decode, and execute operations are delayed as needed until the correct operational mode configuration is loaded.

Predicting operational mode transitions is not limited to transitions between 64-bit, 32-bit, or compatibility modes of operation. For example, the mode transition prediction principles can be applied to interrupts, exceptions, traps, or instructions to cause other mode transfers such as virtualization mode transfers, system management mode transfers, or secure mode (e.g., trusted execution mode) transfers. Moreover, the concepts described herein are not limited to any particular processor architecture or microarchitecture. One having ordinary skill in the art will recognize that the concepts described herein may apply to predicting transfers or transitions between various operating modes across various processor architectures.

In one embodiment, logic operations described herein are performed by at least one integrated circuit defined by data stored on a machine-readable medium. The data, if performed by at least one machine, causes the at least one machine to fabricate the at least one integrated circuit. The at least one integrated circuit, when fabricated, performs operations including a machine-readable medium having stored thereon data, which if performed by at least one machine, causes the at least one machine to fabricate at least one integrated circuit to perform operations including decoding a first instruction into a first decoded instruction, the first instruction to cause a control flow change within the at least one integrated circuit to a second set of instructions, and predicting an operational mode of the at least one integrated circuit after completing executing of the first decoded instruction before completing execution of the first decoded instruction.

In one embodiment, a processing apparatus comprises first logic to decode a first instruction into a first decoded instruction, the first decoded instruction to perform a control flow change within the processing apparatus from a first set of instructions to a target in a second set of instructions. The processing apparatus can additionally comprise second logic to predict an operational mode associated with the target in the second set of instructions based on configuration data or attributes associated with a first set of instructions and/or an address of or associated with the target in the second set of instructions, where the first set of instructions are associated with an instruction pointer of the processing apparatus prior to execution of the first instruction.

In one embodiment, a non-transitory machine-readable medium stores instructions which, when performed by a processing system including one or more processors, cause the processing system to perform operations including decoding a first instruction into a first decoded instruction, the first instruction to perform a control flow change within the processing system to target in a second set of instructions, and predicting an operational mode of at least one of the one or more processors after completing executing of the decoded instruction, where the first set of instructions includes the first instruction.

In one embodiment, a processing system comprises one or more processors coupled to memory, where the processors are configured to execute instructions from memory to perform operations to fetch an instruction to perform a control flow change from a first set of instructions to a control flow target in a second set of instructions, decode the instruction into a decoded instruction, begin execution of the decoded instruction, and during execution of the instruction, predict an operational mode associated with a control flow target. In one embodiment, the prediction is based on configuration data associated with the first set of instructions. In one embodiment, the prediction is based on target address of the control flow target in the second set of instructions. In one embodiment, the prediction is based on past operational mode behavior associated with the first set of instruction or instructions to perform operations similar to the first set of instructions.

In some embodiments, the logic and instructions described herein refer to specific configurations of hardware, such as application specific integrated circuits (ASICs), configured to perform certain operations or having a predetermined functionality. Such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

Of course, one or more parts of an embodiment may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims that follow.

What is claimed is:

1. A non-transitory machine-readable medium having stored thereon data, which when read by at least one machine, causes the at least one machine to fabricate at least one integrated circuit configured to perform operations including:
   decoding a first instruction into a first decoded instruction, the first instruction to cause a control flow transfer within the at least one integrated circuit from a first set of instructions to a target in a second set of instructions; and
   predicting an operational mode of the at least one integrated circuit, the operational mode associated with the second set of instructions, wherein the operational mode is predicted before completing execution of the first decoded instruction, and wherein a code segment descriptor is to include at least two flags to be utilized in predicting the operational mode of the at least one integrated circuit, a first flag defining a default size for data and addresses within a segment and a second flag of a code segment descriptor to indicate a 64-bit mode or a 32-bit compatibility mode.

2. The medium as in claim 1, wherein the operations additionally include predicting the operational mode of the at least one integrated circuit based on an operational mode associated with the first set of instructions.

3. The medium as in claim 1, wherein the operations additionally include predicting the operational mode based on an address associated with the target in the second set of instructions.

4. The medium as in claim 1, wherein the operations additionally include predicting the operational mode based on past behavior associated with the first instruction.

5. The medium as in claim 4, wherein the past behavior includes operational mode changes or operational mode predictions associated with the first instruction.

6. The medium as in claim 1, wherein the operations additionally include loading configuration data associated with a predicted operational mode into internal registers of the at least one integrated circuit.

7. The medium as in claim 1, wherein the operational mode of the at least one integrated circuit includes one of a 64-bit mode, a 32-bit mode, or a compatibility mode.

8. The medium as in claim 7, wherein the compatibility mode is a 32-bit compatibility mode.

9. The medium as in claim 1, wherein the operational mode of the at least one integrated circuit includes one or more of a virtualization mode, a system management mode, and a secure execution mode.

10. The medium as in claim 9, wherein the operations additionally include predicting a target operational mode during an event of the at least one integrated circuit, the event including one of a trap, interrupt, or exception.

11. The medium as in claim 1, wherein the operations additionally include:
    executing the decoded first instruction; and
    while executing the decoded first instruction, speculatively fetching instructions from the second set of instructions using a predicted operational mode.

12. The medium as in claim 1, wherein the operations additionally include:
    resolving the predicting of the operational mode; and
    completing execution of the decoded first instruction.

13. The medium as in claim 12, wherein resolving the predicting of the operational mode includes loading actual configuration data associated with the second set of instructions and comparing the actual configuration data with predicted configuration data.

14. The medium of claim 1, wherein when the first and second flags are not set, an addressing mode of the operational mode is 16-bit.

15. A processing apparatus comprising:
    decode circuitry to decode a first instruction into a first decoded instruction, the first decoded instruction to perform a control flow transfer within the processing apparatus from a first set of instructions to a target in a second set of instructions; and
    prediction circuitry to predict an operational mode of the processing apparatus, the operational mode associated with the second set of instructions and predicted before completing execution of the first decoded instruction, and wherein a first flag defining a default size for data and addresses within a segment and a second flag of a code segment descriptor to indicate a 64-bit mode or a 32-bit compatibility mode are utilized in predicting the operational mode of the processing apparatus.

16. The processing apparatus as in claim 15, wherein the prediction circuitry is to predict the operational mode based on operational mode configuration data associated with the first set of instructions.

17. The processing apparatus as in claim 15, wherein the prediction circuitry is to predict the operational mode based on an address associated with the target in the second set of instructions.

18. The processing apparatus as in claim 15, wherein the first set of instructions is at least in part in a first code segment and the second set of instructions is at least in part in a second code segment that differs from the first code segment.

19. The processing apparatus as in claim 15, wherein the first set of instructions and the second set of instructions are in the same code segment.

20. A method comprising:
    decoding a first instruction into a first decoded instruction, execution of the first decoded instruction to perform a control flow transfer within a processing system from a first set of instructions to a second set of instructions; and
    predicting an operational mode of at least one integrated circuit associated with the second set of instructions, the operational mode predicted before completing execution of the first decoded instruction, and wherein a first flag defining a default size for data and addresses within a segment and a second flag of a code segment descriptor to indicate a 64-bit mode or a 32-bit compatibility mode are utilized in predicting the operational mode of the at least one integrated circuit associated with the second set of instructions.

21. The method as in claim 20, further comprising:
executing the first decoded instruction;
while executing the first decoded instruction, speculatively fetching instructions from a target associated with the control flow transfer using a predicted operational mode;
resolving the predicting of the operational mode; and
completing execution of the first decoded instruction.

22. The method as in claim 21, wherein resolving the predicting of the operational mode includes loading actual configuration data associated with the second set of instructions and comparing the actual configuration data with predicted configuration data.

23. The method as in claim 22, further comprising:
loading the actual configuration data associated with the second set of instructions from a segment descriptor associated with the second set of instructions.

\* \* \* \* \*